US010266699B2

(12) United States Patent
Rueger et al.

(10) Patent No.: US 10,266,699 B2
(45) Date of Patent: Apr. 23, 2019

(54) ELECTRICALLY CONDUCTIVE, COLORED INTERFERENCE PIGMENTS (71) Applicant: MERCK PATENT GMBH, Darmstadt (DE)

(72) Inventors: Reinhold Rueger, Roedermark (DE); Bjoern Kleist, Gimbsheim (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/534,743

(22) PCT Filed: Nov. 23, 2015

(86) PCT No.: PCT/EP2015/002351
§ 371 (c)(1),
(2) Date: Jun. 9, 2017

(87) PCT Pub. No.: WO2016/091354
PCT Pub. Date: Jun. 16, 2016

(65) Prior Publication Data
US 2017/0321058 A1 Nov. 9, 2017

(30) Foreign Application Priority Data
Dec. 12, 2014 (DE) .................. 10 2014 018 276

(51) Int. Cl.
C09C 1/00 (2006.01)
B05D 7/24 (2006.01)
C09D 5/24 (2006.01)
C09D 7/12 (2006.01)
C09D 7/40 (2018.01)
D21H 17/63 (2006.01)
D21H 19/38 (2006.01)
D21H 21/30 (2006.01)
D21H 21/40 (2006.01)
C04B 35/628 (2006.01)

(52) U.S. Cl.
CPC ............. *C09C 1/0021* (2013.01); *B05D 7/24* (2013.01); *C04B 35/62805* (2013.01); *C04B 35/62821* (2013.01); *C04B 35/62823* (2013.01); *C04B 35/62839* (2013.01); *C04B 35/62884* (2013.01); *C04B 35/62894* (2013.01); *C04B 35/62897* (2013.01); *C09C 1/0015* (2013.01); *C09D 5/24* (2013.01); *C09D 7/40* (2018.01); *C09D 7/70* (2018.01); *D21H 17/63* (2013.01); *D21H 19/38* (2013.01); *D21H 21/30* (2013.01); *D21H 21/40* (2013.01); *C01P 2004/20* (2013.01); *C01P 2004/61* (2013.01); *C01P 2006/40* (2013.01); *C01P 2006/62* (2013.01); *C04B 2235/3217* (2013.01); *C04B 2235/3232* (2013.01); *C04B 2235/349* (2013.01); *C04B 2235/3418* (2013.01); *C04B 2235/3427* (2013.01); *C04B 2235/386* (2013.01); *C04B 2235/5292* (2013.01); *C04B 2235/5436* (2013.01); *C09C 2200/102* (2013.01); *C09C 2200/1004* (2013.01); *C09C 2200/1087* (2013.01); *C09C 2200/301* (2013.01); *C09C 2200/302* (2013.01); *C09C 2200/304* (2013.01); *C09C 2200/306* (2013.01); *C09C 2200/307* (2013.01); *C09C 2200/308* (2013.01); *C09C 2200/401* (2013.01); *C09C 2220/20* (2013.01)

(58) Field of Classification Search
None
See application file for complete search history.

(56) References Cited

U.S. PATENT DOCUMENTS

| | | | |
|---|---|---|---|
| 3,053,683 A | 9/1962 | Yolles | |
| 3,087,827 A * | 4/1963 | Klenke, Jr. ............ | B82Y 30/00 106/417 |
| 3,949,139 A | 4/1976 | Dunning et al. | |
| 4,321,087 A | 3/1982 | Cueli | |
| 4,568,609 A | 2/1986 | Sato | |
| 5,271,771 A | 12/1993 | Franz | |
| 5,320,781 A | 6/1994 | Stahlecker | |
| 5,322,561 A | 6/1994 | Prengel | |
| 5,356,471 A | 10/1994 | Reynders | |
| 5,472,640 A | 12/1995 | Bruckner | |
| 5,628,932 A | 5/1997 | Linton | |
| 5,733,658 A | 3/1998 | Schmid | |
| 5,827,361 A | 10/1998 | Bernhardt | |
| 6,280,520 B1 | 8/2001 | Andes | |
| 6,322,642 B1 | 11/2001 | Bocquet | |
| 6,686,042 B1 | 2/2004 | LeGallee | |
| 6,997,982 B2 | 2/2006 | Pfaff | |
| 8,017,236 B2 | 9/2011 | Johnson | |
| 2004/0165272 A1 | 8/2004 | Phillips | |
| 2008/0279796 A1* | 11/2008 | Handrosch ............ | C09C 1/0015 424/63 |

(Continued)

FOREIGN PATENT DOCUMENTS

DE 2557796 C1 2/1985
DE 3842330 A1 6/1990
(Continued)

OTHER PUBLICATIONS

A. C. Ferrari and J. Robertson, "Interpretation of Raman Spectra of Disordered and Amorphous Carbon," Physical Review 6, vol. 61, No. 20, 2000, pp. 14095-14107.
(Continued)

*Primary Examiner* — Katie L. Hammer
(74) *Attorney, Agent, or Firm* — Millen, White, Zelano & Branigan, PC (57) ABSTRACT

The present invention relates to electrically conductive, colored interference pigments, in particular flake-form interference pigments, which have an outermost layer which comprises crystalline carbon in the form of graphite and/or graphene, to a process for the preparation of such pigments, and to the use of the pigments prepared in this way.

8 Claims, 3 Drawing Sheets

(56) References Cited

U.S. PATENT DOCUMENTS

| | | | | |
|---|---|---|---|---|
| 2010/0258769 A1* | 10/2010 | Krietsch | ............... | C09C 1/0015 252/519.4 |
| 2011/0105676 A1* | 5/2011 | Gao | ..................... | C09C 1/0015 524/548 |
| 2012/0282311 A1* | 11/2012 | Schmid | ................. | C09C 1/0021 424/401 |
| 2013/0264523 A1* | 10/2013 | Rathschlag | ........... | C09C 1/0081 252/502 |
| 2015/0183995 A1* | 7/2015 | Henglein | ............ | C09B 67/0098 424/401 |

FOREIGN PATENT DOCUMENTS

| | | |
|---|---|---|
| DE | 4140296 A1 | 6/1993 |
| DE | 4227082 A1 | 2/1994 |
| DE | 4237990 A1 | 5/1994 |
| DE | 10153197 A1 | 5/2003 |
| DE | 69916717 T2 | 5/2005 |
| EP | 139557 A1 | 5/1985 |
| EP | 525526 B1 | 2/1990 |
| EP | 675175 | 10/1995 |
| EP | 735114 A1 | 10/1996 |
| EP | 743654 | 11/1996 |
| EP | 359569 B1 | 3/1997 |
| EP | 950693 A1 | 10/1999 |
| EP | 1641886 B1 | 10/2010 |

OTHER PUBLICATIONS

International Search Report for PCT/EP2015/2351 dated Mar. 15, 2016.

Fitzer et al.; International Union of Pure and Applied Chemistry Recommended terminology for the description of carbon as a solid (IUPAC Recommendations 1995) Pure and Applied Chemistry vol. 67, Issue 3 Published Online: Jan. 1, 2009.

* cited by examiner

ELECTRICALLY CONDUCTIVE, COLORED INTERFERENCE PIGMENTS

The present invention relates to electrically conductive, coloured interference pigments, in particular semitransparent, flake-form interference pigments, which have an outermost layer which comprises crystalline carbon in the form of graphite and/or graphene, to a process for the preparation of such pigments, and to the use of the pigments prepared in this way.

Electrically conductive pigments are employed today in various areas of application, for example for antistatic coatings of a very wide variety of types, antistatic floorcoverings, antistatic finishes of explosion-protected rooms, in screening coatings and packaging in electrical technology, in field-controlling insulating materials or in electrically conductive primers for the coating of plastics.

It is still usual to employ carbon black or graphite as conductive filler in the respective application media. However, the use of carbon black or graphite results in a dark coloration of the materials to which it has been added, which is often perceived as disadvantageous.

Electrically conductive pigments based on transparent substrates, especially based on thin mica flakes, have therefore already been known and available for some time. These pigments generally have at least one conductive coating comprising a doped tin oxide on the mica substrate. Antimony-doped tin dioxide is frequently employed. Pigments of this type are commercially available, for example, as Minatec® 31 CM or Minatec® 51 CM from Merck KGaA, Germany. They are described, inter alia, in the patent specifications DE 38 42 330, DE 42 37 990, EP 0 139 557, EP 0 359 569 and EP 0 743 654.

Such pigments have high transparency and a pale inherent colour and therefore offer many optical advantages over the use of carbon black or graphite, but usually have an uncoloured or pale-grey inherent coloration. In order to achieve coloured and/or opaque conductive application media, the conductive pigments must be employed in combination with other colorants. Such combinations are technically possible, but often result in an extremely high pigment weight concentration in the application media. In particular, the use of colorants reduces or interrupts the formation of conductive pathways in the application medium, with the result that a considerable increase in the electrical resistance occurs there. This increase cannot be compensated in all cases by an equally increased concentration of conductive pigments, since the application systems have technically necessitated limits of the pigment loading, the exceeding of which results in processing problems or problems in achieving the desired technical results.

There is therefore a need for electrically conductive pigments with which coloured electrically conductive application media having satisfactory hiding power can be obtained without the need to employ further colorants.

Effect pigments which have an improved hiding power compared with transparent effect pigments are already known. In general, opaque support materials or semitransparent layers on transparent support materials are employed in order to increase the hiding power of the effect pigments. Opacity of the support flakes or coatings can be achieved here, for example, by the inclusion of particulate carbon black into dielectric materials. Pigments which comprise such supports or coatings are known as "carbon inclusion" pigments.

Effect pigments having a carbon-containing layer during the production of which metal oxide layers which are already located on the flake-form support are reduced are described, for example, in the publications EP 0 525 526 and EP 0 735 114.

Thus, pale-grey, anthracite-coloured or black pigments are obtained in EP 0 525 526 B1 by coating effect pigments which have been coated with titanium dioxide and at least one further metal oxide with carbon-containing layers under inert conditions by pyrolysis, during which the metal of the metal oxide is reduced. The pigments obtained are described as abrasion-resistant and are employed, in particular, in cosmetics. Nothing is reported on their electrical properties.

EP 0 735 114 A1 discloses lustre pigments based on reduced $TiO_2$-coated silicate flakes which are obtained from titanium dioxide-coated silicate flakes in a gas mixture comprising an evaporated organic compound and ammonia. The pigments are described as resistant to condensation water and as weather-resistant, their electrical properties are not discussed.

The decomposition of polymer layers of various composition on the surface of effect pigments enables the preparation of coloured or optically variable effect pigments having good lustre behaviour, as is evident, for example, from EP 1 641 886 B1 or DE 699 16 717 T2. Thus, the pigments described in EP 1 641 886 B1 contain on their surface a carbon-containing ionic composition which only contains small amounts of nitrogen, whereas DE 699 16 717 T2 describes effect pigments in which the coating on the support material comprises 5-25 percent by weight of nitrogen in an unsaturated compound. Neither patent specification says anything regarding the electrical properties of the pigments obtained.

DE 2557796 C2, DE 4227082 A1 and EP 0 675 175 A2 each disclose carbon-containing pigments in which carbon obtained from colloidal material is included in metal oxide layers which are precipitated onto effect pigment substrates, where the covering with colloid and metal oxide takes place simultaneously and carbon is subsequently obtained from the colloidal material by pyrolysis.

The effect pigments formed are described as lustrous and weathering-stable, but, according to EP 0 675 175, are not electrically conductive. The latter can also be explained well by the high content of metal oxide which surrounds the included carbon particles and prevents the formation of conductive pathways in the layer.

In order to obtain electrically conductive effect pigments, flake-form pigments are, according to DE 41 40 296 A1, coated with a metal oxide layer permeated with carbon black particles which is doped with additional metal oxide particles in order to establish or increase the electrical conductivity of the pigment. Whereas the metal oxide layer is generally a titanium dioxide layer, $SiO_2$ or $Al_2O_3$ are additionally included therein in addition to carbon black particles, which results in improved conductivity. However, the pigments only achieve a specific powder resistance of $2\times10^6$ ohm*cm in the best case. The pigments obtained in this way have colour nuances from black to pale grey or silver-grey.

The prior-art pigments described above have either good colour properties with undetermined electrical properties or satisfactory electrically conductive properties with a dull coloration. For the preparation of application media having reliable screening or antistatic electrical properties, however, specific powder resistances of the electrically conductive pigments employed of at most $1\times10^6$ ohm*cm are necessary in order to guarantee the requisite electrical properties of the end products. In addition, there is still a need for effect pigments having attractive colour properties which have the requisite high electrical conductivity.

The object of the present invention is to provide electrically conductive effect pigments having bright interference colours which have a specific powder resistance of at most $1 \times 10^6$ ohm*cm or less and have such a high hiding power that a coating provided merely with these pigments has a clear visible bright colour, even on a white background, i.e. the pigments have a good hiding power.

In addition, it is also an object of the present invention to provide a process for the preparation of the pigments described above.

A further object of the present invention consists in indicating the use of pigments of this type.

The object of the present invention is achieved by electrically conductive, coloured interference pigments based on a flake-form support, where the support has a coating comprising one or more layers and where the outermost layer, which is the most remote from the support, consists of at least 95% by weight, based on the weight of this layer, of carbon and comprises crystalline carbon in the form of graphite and/or graphene.

The object of the invention is likewise achieved by a process for the preparation of the said conductive pigments, in which flake-form support particles, which may have been coated with one or more layers, are coated with an outermost layer which consists of at least 95% by weight, based on the weight of this layer, of carbon and comprises crystalline carbon in the form of graphite and/or graphene, in a reactor in a stream of carrier gas with feed of a gaseous, carbon-containing compound by pyrolytic decomposition of the carbon-containing compound.

The object is furthermore achieved by the use of the electrically conductive interference pigments described above in paints, coatings, printing inks, coating compositions, security applications, plastics, ceramic materials, glasses, paper, films, in heat protection, in floorcoverings, for laser marking, in dry preparations or pigment preparations.

The present invention relates to an electrically conductive, coloured flake-form interference pigment which is based on a flake-form support and has been coated with one or more layers, where the outermost layer of the coating, which is the most remote from the support, consists of at least 95% by weight, based on the weight of this layer, of carbon and comprises crystalline carbon in the form of graphite and/or graphene.

The outermost layer, which consists of at least 95% by weight, based on the weight of this layer, of carbon and comprises crystalline carbon in the form of graphite and/or graphene, is called "outermost, crystalline carbon-containing layer" below, unless indicated otherwise.

Preference is given to an embodiment of the present invention in which the outermost, crystalline carbon-containing layer consists of at least 98% by weight of carbon.

This outermost, crystalline carbon-containing layer surrounds the support flake or the layer(s) located beneath this outermost layer on the support flake and is preferably compact and formed as a continuous layer. It has a geometrical thickness in the range 0.5-20 nm, but particularly preferably in the range of merely 1-5 nm. In the lower layer-thickness range from 0.5 to 3 nm, this corresponds to a single graphene layer or graphite which is composed of very few (<10) carbon layers.

Compared with industrial black, which is also known as carbon black, both graphene and also graphite crystals have significantly higher ordering. The term carbon black is applied to a finely divided carbon which is produced industrially by thermal decomposition or by incomplete combustion of hydrocarbons and which consists of spherical primary particles which have grown together to form aggregates having a particle size of less than 1000 nm. They contain a small amount of foreign constituents.

Whereas graphene represents a single layer in graphite structure whose nature is described analogously to a polycyclic aromatic hydrocarbon of quasi-infinite size and in which the carbon atoms are in a honeycomb-like arrangement in the layer, graphite represents an allotropic form of the element carbon which consists of layers of hexagonally arranged carbon atoms in a ring system condensed in a planar arrangement. The layers are stacked parallel to one another in crystallographically three-dimensional long-range order. There are two allotropic forms with a different stack arrangement, hexagonal and rhombohedral.

Types of carbon which contain the element carbon in the allotropic form of graphite, irrespective of structure defects present (volume proportion and homogeneity of the crystalline domains), i.e. in which a three-dimensional crystalline long-range order in the material can be demonstrated by diffraction methods, are also known as graphitic carbon.

According to this nomenclature (see W. Klose et. al., "*Terminologie zur Beschreibung von Kohlenstoff als Feststoff*"[Terminology for the Description of Carbon as a Solid], Deutsche Keramische Gesellschaft, Specialist Committee Report No. 33, 3rd report of the Carbon Working Group, 2009), it is justified also to refer to the crystalline carbon-containing outermost layer of the interference pigments according to the invention as "layer of graphitic carbon".

The said structural differences also explain the at least partly different properties of graphene and graphite crystals compared with conventional industrial blacks. Thus, the former have, for example, significantly greater electrical conductivity than standard particulate industrial black. The electrical conductance in graphite crystals is different parallel and perpendicular to the individual carbon planes.

Figure 1:
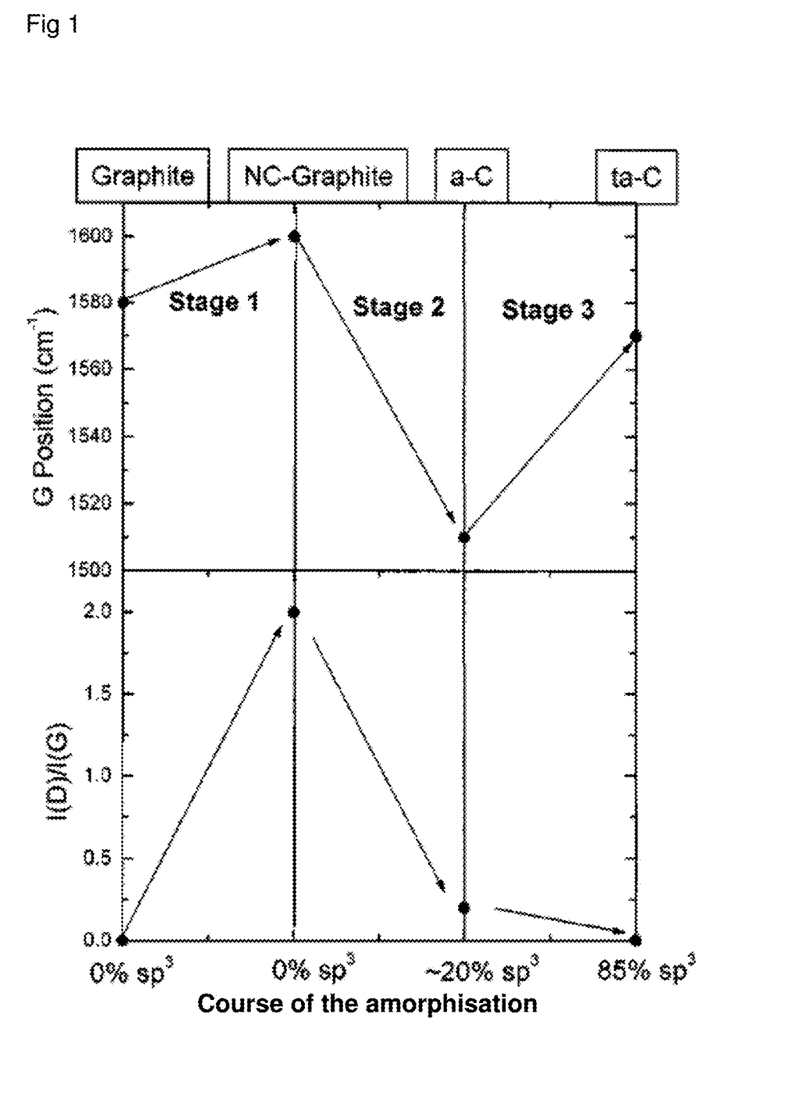
FIG. 1: shows a diagram for the characterisation of carbon with the aid of Raman spectroscopy by the method of A. C. Ferrari and J. Robertson, University of Cambridge

Surprisingly, the inventors of the present invention have now succeeded in preparing effect pigments in which the presence of graphene or graphite crystals in an outermost layer essentially consisting of carbon (layer of graphitic carbon) on a flake-form support material can be demonstrated. This also explains the high electrical conductivity of the pigments obtained, which can be adjusted specifically via the geometrical layer thickness of the outermost, crystalline carbon-containing layer on the support particles. The electrical conductivity of the pigments obtained increases significantly even at a very small geometrical layer thickness of only a few nanometers, which can be determined via a significantly reduced specific powder resistance of the pigments obtained. The carbon layer is characterised by means of Raman spectroscopy. The evaluation is carried out in accordance with "Interpretation of Raman spectra of disordered and amorphous carbon, A. C. Ferrari and J. Robertson, University Cambridge, 24 Nov. 1999". A carbon layer is essentially described with two peaks which occur in the corresponding Raman spectra owing to $sp^2$-hybridised carbon atoms. The G peak (graphite) at a wavenumber of 1580 to 1600 $cm^{-1}$ results from stretch vibrations of $sp^2$-hybridised carbon atoms in rings and chains. The D peak (disorder), by contrast, is in a wavenumber range from 1360 to 1400 $cm^{-1}$ and results from centre-symmetrical stretch vibrations. In pure crystalline graphite, this vibration is forbidden and therefore only occurs in subordinate systems. If the wavenumber of the peaks obtained and the intensity ratio I(D)/I(G) of the material to be characterised is determined from the Raman spectrum obtained, a distinction can be made in accordance with the diagram according to FIG.

1 between graphite, NC graphite (nanocrystalline graphite), a-C (amorphous carbon) and ta-C (tetrahedal amorphous carbon). In this way, the presence of nanocrystalline graphite in the pigments according to the invention is confirmed.

Pigments or support materials are referred to as flake-form if their outer shape corresponds to a flat structure which, with its upper side and lower side, has two approximately parallel surfaces whose length and width dimension represents the greatest dimension of the pigment or support material. The separation between the said surfaces, which represents the thickness of the flake, has, by contrast, a small dimension.

The length and width dimension of the pigments here is between 1 and 250 µm, preferably between 2 and 100 µm, and in particular between 5 and 60 µm. It also represents the value which is usually referred to as the particle size of the interference pigments. This is not crucial as such, but a narrow particle size distribution of the interference pigments according to the invention is preferred. A moderately reduced fines content is particularly preferred. In a pigment powder which consists of the pigments according to the invention, the proportion of particles having a particle size below 10 µm is <30% by vol., based on the volume of the pigment powder.

The particle size and particle size distribution can be determined by various methods which are usual in the art. However, use is preferably made in accordance with the invention of the laser diffraction method in a standard process by means of a Malvern Mastersizer 2000, APA200 (product of Malvern Instruments Ltd., UK). This process has the advantage that particle size and particle size distribution can be determined simultaneously under standard conditions.

The particle size and the thickness of individual particles can in addition be determined with the aid of SEM (scanning electron microscope) images. In these, particle size and geometrical particle thickness can be determined by direct measurement. In order to determine average values, at least 1000 particles are evaluated individually and the results are averaged.

The thickness of the interference pigments is between 0.05 and 5 µm, in particular between 0.3 and 2 µm.

The interference pigments according to the invention have a form factor (ratio of length or width to thickness) in the range from 2:1 to 500:1, preferably in the range from 20:1 to 200:1, in particular from 50:1 to 100:1.

A pigment is regarded as electrically conductive in the sense of the present invention if it has a specific powder resistance in the range up to 1 megaohm*cm ($1 \times 10^6$ ohm*cm). The interference pigments according to the invention preferably have a specific powder resistance in the range up to $1 \times 10^4$ ohm*cm, in particular in the range from 10 to 1000 ohm*cm. The values indicated here relate to field strengths of up to 10 V/mm, where the field strength applies to the measurement voltage applied.

The specific powder resistance is measured here by compressing an amount of in each case 0.5 g of pigment in a Plexiglas tube having a diameter of 2 cm against a metal electrode using a metal ram with the aid of a 10 kg weight. The electrical resistance R of the pigments compressed in this way is measured. The layer thickness L of the compressed pigment gives the specific resistance p of the pigment powder in accordance with the following relationship:

$$\rho = R * \pi * (d/2)^2 / L (ohm*cm).$$

Coloured interference pigments are taken to mean effect pigments which, based on at least one flake-form support material and one or more thin layers located thereon in an application medium in which the pigments are aligned in a planar manner, are able to amplify or weaken light by means of interference effects in such a way that, at least in a wavelength region of the visible spectrum of sunlight, increased light reflection is perceptible to the observer with the naked eye. This increased, selective light reflection is perceived by the observer as a bright colour. It can be supplemented with or superimposed by absorption effects arising from the material of the flake-form support or the layers. At least one interference colour is visible to the observer in the application medium if the application medium is located on a white or black background.

However, different interference colours can also be perceived at different illumination and/or viewing angles. In this case, the term optically variable interference pigments is used. Optically variable pigments are pigments which leave a different visually perceptible colour and/or brightness impression at different illumination and/or viewing angles. In the case of different colour impressions, this property is referred to as colour flop.

The interference pigments according to the invention either have the same interference colour at each illumination and/or viewing angle or different interference colours at different illumination and/or viewing angles, i.e. are (mono) chromatically or optically variable.

The adjustment of the colour properties takes place here via the material, the sequence and thickness of the pigment support and/or the individual layers on the support.

In accordance with the invention, the flake-form support comprises natural or synthetic mica flakes, kaolin, sericite or talc flakes, BiOCl flakes, iron oxide flakes, $TiO_2$ flakes, glass flakes, borosilicate flakes, boron nitride flakes, $SiO_2$ flakes, $Al_2O_3$ flakes, metal flakes or mixtures of two or more thereof. Particular preference is given to natural or synthetic mica flakes of any type, other phyllosilicates, such as talc, kaolin or sericite, flake-form $SiO_2$, flake-form $TiO_2$ and/or glass flakes. The particle size of the support flakes is in the same range as the particle sizes indicated above for the interference pigments according to the invention, namely in the range between 1 and 250 µm, preferably between 2 and 100 µm, and in particular between 5 and 60 µm. The thickness of these support flakes is in the range from 0.04 to 1.5 µm, in particular in the range from 0.1 to 1 µm.

In a first embodiment of the present invention, the support flakes may be coated directly with the crystalline carbon-containing layer. In this case, it is necessary, in order to establish an interference colour, for the support flake to have a homogeneous material composition and to have the most uniform layer thickness possible. Such flakes are best produced synthetically, since the said conditions can be complied with better in the case of the resultant support flakes with the synthetic production methods available than, for example, with natural phyllosilicates, such as mica, talc, etc. Synthetically produced support flakes are preferably colourless and transparent. Support flakes comprising glass, $SiO_2$, $Al_2O_3$, $TiO_2$ and/or BiOCl are therefore particularly preferred if the substrate is coated directly with a layer which consists of at least 95% by weight, based on the weight of this layer, of carbon and comprises crystalline carbon in the form of graphite and/or graphene.

In a second embodiment of the present invention, which is preferred, one or more dielectric layers, at least one of which is composed of one or more materials having a refractive index n in the range n 1.8, are, however, present between the flake-form support and the outermost, crystalline carbon-containing layer.

Materials having a refractive index in the range n≥1.8 are referred to as high-refractive-index.

High-refractive-index materials of this type which are present in the pigments in accordance with the present invention are preferably metal oxides and/or metal oxide hydrates, namely titanium dioxide, titanium dioxide hydrate, zirconium dioxide, zirconium dioxide hydrate, tin oxide, tin oxide hydrate, zinc oxide, zinc oxide hydrate, iron(II) oxide, iron(III) oxide, goethite, chromium oxides, cobalt oxides and/or mixed phases thereof. They may be present in one or also in a plurality of layers between the flake-form support and the outermost, crystalline carbon-containing layer. The layers of high-refractive-index materials may also be applied alternately with layers of low-refractive-index materials, for example of metal oxides and/or metal oxide hydrates, such as silicon dioxide, silicon dioxide hydrate, aluminium oxide, aluminium oxide hydrate and/or of mixed phases thereof, or of $MgF_2$. The low-refractive-index materials have a refractive index n in the range n<1.8. The layer thickness of the layer or layers of low-refractive-index materials is not particularly limited and is in the range from 1 to 300 nm, preferably from 5 to 200 nm. If an optically variable behaviour of the resultant interference pigments is desired, the geometrical layer thickness of at least one layer of low-refractive-index material should be at least 30 nm, preferably at least 50 nm.

The layer thickness of the layer comprising materials having a refractive index n in the range n≥1.8 is from 1 to 350 nm, in particular in the range from 20 to 300 nm. However, it is preferred in accordance with the invention if at least one of the high-refractive-index layers has a geometrical layer thickness of greater than 70 nm. In particular, the geometrical layer thickness of at least one of these layers should be in the range from 80 to 300 nm. If at least one layer comprising high-refractive-index materials having such a layer thickness is present, a bright interference colour of the resultant electrically conductive interference pigments according to the invention can readily be established via the in each case specific layer thickness of the high-refractive-index layer in the range indicated.

Optically variable pigments according to the invention can, by contrast, be obtained if a plurality of dielectric layers, which are preferably applied in the material sequence high refractive index/low refractive index/high refractive index, are located between the flake-form support and the outermost, crystalline carbon-containing layer. Even in the case of this layer structure, it is advantageous if at least one of the layers comprising high-refractive-index materials has a geometrical layer thickness in the above-mentioned range.

The dielectric layer or dielectric layers having a refractive index n in the range n≥1.8 particularly preferably consists of titanium dioxide and/or titanium dioxide hydrate and is present in a stoichiometric composition, i.e. not in the reduced state.

Particular preference is given in accordance with the invention to electrically conductive pigments in which a layer of titanium dioxide (anatase or rulile modification) and/or titanium dioxide hydrate ($TiO_2$ layer below) is located between a flake-form support and the outermost, crystalline carbon-containing layer or in which a layer structure which consists at least of $SiO_2$ layer/$TiO_2$ layer, of $TiO_2$ layer/$SiO_2$ layer or of a three-layer system comprising $TiO_2$ layer/$SiO_2$ layer/$TiO_2$ layer is located between the flake-form support and the outermost, crystalline carbon-containing layer, where in all cases the geometrical layer thickness of at least one of the $TiO_2$ layers should preferably be greater than 70 nm.

Particular preference is given to electrically conductive interference pigments in which a layer of titanium dioxide (anatase or rulile modification) and/or titanium dioxide hydrate or at least one three-layer system comprising $TiO_2$ layer/$SiO_2$ layer/$TiO_2$ layer is located on a flake-form support comprising natural or synthetic mica, $SiO_2$ flakes, $TiO_2$ flakes, $Al_2O_3$ flakes or glass flakes, in each case followed by an outermost, crystalline carbon-containing layer. In particular, the flake-form support materials in this layer structure are preferably natural or synthetic mica and $SiO_2$ flakes. Here too, the geometrical layer thickness of at least one $TiO_2$ layer in each case should preferably be at least 70 nm and in particular in the range from 80 to 300 nm.

The electrically conductive, coloured interference pigments according to the invention are semitransparent, i.e. they not only transmit or reflect part of the incident visible light in the application medium in the case of planar alignment, but also absorb a certain proportion of the incident light in the visible wavelength region. This can essentially be ascribed to the absorption capacity of the outermost, crystalline carbon-containing layer if no further absorbent materials are present in the layer system of the interference pigment. It has surprisingly been found here that the absorption capacity of the electrically conductive interference pigments according to the invention correlates with the degree of their electrical conductivity. Accordingly, the electrical conductance of the pigments according to the invention increases continuously with increasing layer thickness of the outermost, crystalline carbon-containing layer.

In the case of a geometrical layer thickness of the outermost, crystalline carbon-containing layer in the range from 1 to 5 nm, by contrast, the interference colour or the angle-dependent interference colours and the lustre and chroma generated by the layers lying below the outermost, crystalline carbon-containing layer and by the support material hardly changes at all. However, the ΔL value and thus the degree of the hiding power that can be achieved with the pigments according to the invention in the application medium changes with increasing layer thickness of the outermost, crystalline carbon-containing layer.

The ΔL value is a measure of the transparency of interference pigments. If it is particularly high, the interference pigments have high transparency, but no significant hiding power, whereas a very low ΔL value is an indication of interference pigments having high hiding power.

Whether interference pigments are thus rather more transparent or rather more opaque can be determined via lightness values L* of coatings which comprise the interference pigments on black/white coating test charts. The measurements are carried out in the CIEL*a*b* colour space by means of a suitable measuring instrument, for example using an ETA FX11 colorimeter (spectrometer from STEAG-ETA Optic GmbH, Inc.) The measurements are carried out at the mass tone angle 45°/90° (illumination angle 45°, measurement angle 90°), in each case over the coated black and white coating test chart. The L* values determined in each case are inserted into the following equation:

$$\Delta L = (L^*_{45/90/white} - L^*_{45/90/black})$$

(determination of the hiding power HP by the Hofmeister method (Colorimetric evaluation of pearlescent pigments, "Mondial Coleur 85" Congress, Monte Carlo, 1985, in accordance with the equation $HP=100/(L^*_{45/90/white} - L^*_{45/90/black})$).

(For the measurements in accordance with the present invention, in each case a pigment dispersion having a proportion by weight of 1.65% of pigment in LC acrylic lacquer (Merck Article No. 270046) is prepared without bubbles and applied to a conventional black/white chart using a 500 µm bar applicator and dried. The pigment is present in the dried layer in a concentration of 13 percent by weight (PWC: 13%). The L* values are measured using an ETA FX11 colorimeter from STEGA ETA-Optic GmbH, Inc., at an illumination angle of 45° and a measurement angle of 90°.)

The electrically conductive, coloured interference pigments according to the invention have ΔL values in the range from 10 to 30, which are determined by the method described above. In this ΔL range, the interference pigments according to the invention have high electrical conductivity, where the specific powder resistance of the pigments is less than $1 \times 10^6$ ohm*cm, preferably less than $1 \times 10^4$ ohm*cm, and in particular in the range from 10 to 1000 ohm*cm. This high electrical conductivity can be achieved with geometrical layer thicknesses of the outer, crystalline carbon-containing layer on the pigments which is merely in the range from 1 to 5 nm. The proportion by weight of this outermost, crystalline carbon-containing layer here is 0.5 to 5% by weight, based on the weight of the pigment.

The pigments according to the invention, whose ΔL values are in the range from 10 to 30, have high lustre, an intense interference colour or an optically variable colour behaviour with high chroma and have a good hiding power, meaning that coatings comprising binders, solvents and the pigments according to the invention applied to conventional black/white coating test charts and dried have a high visible hiding power both on the white coating test chart and on the black coating test chart, which is only observed, if at all, on the black coating test chart in the case of transparent interference pigments. The outermost, crystalline carbon-containing layer of the pigments, in spite of the low layer thickness, is stable and abrasion-resistant and compact, so that quality losses do not have to be expected, even on mechanical stressing of the pigments.

The present invention also relates to a process for the preparation of the said electrically conductive, coloured pigments in which flake-form support particles, which may be coated with one or more layers, are coated with an outermost layer which consists of at least 95% by weight, based on the weight of this layer, of carbon and comprises crystalline carbon in the form of graphite and/or graphene, in a reactor in a stream of carrier gas with feed of a gaseous, carbon-containing compound by pyrolytic decomposition of the carbon-containing compound.

Particulate starting materials employed for the process according to the invention are either the flake-form support particles described above in uncoated form or, preferably, however, support particles which have already been coated in advance with one or more layers. All support and layer materials and layer sequences which have already been described above are possible here.

Both the particulate, flake-form supports and also the supports which have already been coated in advance are commercially available. While the support materials which have not been pre-coated generally also have to be subjected to one or more grinding processes in order to be present in the desired and requisite size distribution, the precoated support materials, which are preferably conventional interference pigments, can be procured from most manufacturers already in the corresponding size range. Otherwise, commercially available interference pigments can also be subjected to grinding and/or classification processes before being introduced into the process according to the invention.

However, the said support particles may also, before the coating with the outermost, crystalline carbon-containing layer, be coated with one or more dielectric layers by means of the conventional coating methods which are generally customary for effect pigments. Both wet-chemical and also CVD, PVD or sol/gel processes, all of which are usually used in the coating of effect pigments, can be employed here. Owing to the ease with which the coating process can be carried out and for cost reasons, however, the use of wet-chemical processes with inorganic starting materials is preferred. These are explained briefly below. All other processes mentioned are likewise familiar to the person skilled in the art and do not require further explanation.

The preparation of interference pigments which are coated at least with a layer of $TiO_2$ on a support is carried out by the conventional processes for the preparation of interference pigments, preferably by means of wet-chemical processes. These are described, for example, in the specifications DE 14 67 468, DE 19 59 998, DE 20 09 566, DE 22 14 545, DE 22 15 191, DE 22 44 298, DE 23 13 331, DE 25 22 572, DE 31 37 808, DE 31 37 809, DE 31 51 355, DE 32 11 602 and DE 32 35 017.

To this end, the substrate flakes are suspended in water. A $TiO_2$ layer is preferably applied here analogously to the process described in U.S. Pat. No. 3,553,001. In this process, an aqueous titanium salt solution is slowly added to a suspension of the pigment to be coated, the suspension is heated to 50 to 100° C., and the pH is kept virtually constant in the range from 0.5 to 5.0 by simultaneous addition of a base, for example an aqueous ammonium hydroxide solution or an aqueous alkali-metal hydroxide solution. When the desired $TiO_2$ layer thickness on the pigment flakes has been reached, the addition of the titanium salt solution and the base is terminated. Since the titanium salt solution is added so slowly that quasi-complete deposition of the hydrolysis product on the pigment flakes takes place, there are virtually no secondary precipitations. The process is known as the titration process.

If layers of low-refractive-index materials are also to be applied, the application of an $SiO_2$ layer is explained here by way of example:

For the application of an $SiO_2$ layer, a sodium or potassium water-glass solution is generally employed. The precipitation of a silicon dioxide or silicon dioxide hydrate layer is carried out at a pH in the range from 6 to 10, preferably from 7 to 9.

The coated support particles are worked up in the usual manner for interference pigments, generally by washing, drying and preferably also calcination of the coated support particles. If necessary, this may be followed by grinding and/or classification steps.

The flake-form support particles which have been coated in advance are then introduced into the reactor.

Suitable reactors in which the process according to the invention can be carried out are both rotary-tube furnaces and also fluidised-bed reactors, where the latter are preferentially employed. The coating process is carried out in a stream of carrier gas. The carrier gas employed is an inert gas, synthetic air or forming gas. Examples of inert gases which may be mentioned are nitrogen and argon, where nitrogen is preferentially employed.

A gaseous, carbon-containing compound is fed to the carrier gas. This preferably consists of volatile hydrocarbons, which, besides carbon, only contain hydrogen and possibly also oxygen. Examples which may be mentioned are acetone, ethyne or 2-methyl-3-butyn-2-ol. Acetone and 2-methyl-3-butyn-2-ol are preferentially employed, where acetone is particularly preferred. However, the carrier gas may also itself consist of the gaseous, carbon-containing compound, which in this case takes on both the function of the carrier gas and also that of the gaseous, carbon-containing compound.

It is particularly important for the success of the process according to the invention that the flake-form support particles are in motion and are kept in motion in the reactor during the reaction. To this end, the flake-form support particles must be adequately fluidised during the reaction. If the fluidisation of the support particles by the stream of carrier gas and the gaseous, carbon-containing compound should not be sufficient, suitable fluidisation apparatuses, such as vibration and/or shaking devices, should therefore be employed.

After adequate fluidisation of the flake-form support particles in the reactor, the reaction temperature is set. The temperature during the coating process is set in the reactor so that the carbon-containing, gaseous compound is pyrolytically decomposed. In accordance with the invention, it is in the range from 400° C. to 900° C., preferably in the range from 500° C. to 700° C., and is set depending on the type of carbon-containing compound to be decomposed.

The gaseous, carbon-containing compound can optionally be fed to the reactor before or after the reaction temperature has been reached or during establishment of the reaction temperature. Feed before the requisite reaction temperature has been reached is preferred. It is particularly preferred if the gaseous, carbon-containing compound and the carrier gas are already in the form of a mixture in a suitable ratio before feeding into the reactor and are fed jointly to the reactor. The amount of carbon-containing compound fed in can be controlled here via the temperature and/or the vapour pressure of the corresponding gaseous compound. After completion of the pyrolytic reaction and after the desired layer thickness of the outermost layer has been reached, the carbon source is turned off.

The reaction time is about 5 to 200 minutes, preferably 10 to 150 minutes. Within this reaction time, a compact, continuous outermost layer which consists of at least 95% by weight, preferably at least 98% by weight, based on the weight of this layer, of carbon and comprises crystalline carbon in the form of graphene and/or graphite is applied to the flake-form support particles employed. The layer thickness of this layer increases constantly during the reaction and can be controlled through the selected duration of the reaction. The electrical conductivity and the hiding power of the resultant pigments increases with the layer thickness of the outermost layer.

Since both the lustre and also the chroma of the resultant pigments are also adversely affected in the case of layer thicknesses of the outermost layer of greater than 5 nm, the geometrical layer thickness of the outermost, crystalline carbon-containing layer is preferably set to values in the range from only 1 to 5 nm in the process according to the invention.

After the thermal treatment, the interference pigments obtained are cooled and classified. If necessary, one or more grinding processes can also be carried out before or after the classification for further separation of the pigments obtained.

The process according to the invention can be carried out both in a batch process and also as a continuous process. In addition, it enables a high throughput of pigments in a short time span and is therefore also attractive from an economic point of view.

The present invention also relates to the use of the pigments according to the invention described above in paints, coatings, printing inks, coating compositions, security applications, plastics, ceramic materials, glasses, paper, films, in heat protection, in floorcoverings, for laser marking, in dry preparations and pigment preparations.

Due to their high interference tinting strength, the optically variable behaviour that may be present and the comparatively high hiding power, the pigments according to the invention are highly suitable, merely owing to their colour properties, for use for the pigmentation of application media of the above-mentioned type. They are employed here in the same way as conventional interference pigments. However, it is particularly advantageous that, besides the attractive colour properties, they also have high electrical conductivity, which makes them particularly suitable for use in technical applications that require electrically conductive coatings. Thus, they are particularly suitable for the production of coloured, electrically conductive coatings on various substrates, which can be produced by means of painting or printing processes or other conventional coating processes. Since the pigments according to the invention still have good electrical conductivity even in thin coatings, thin coatings having high lustre, high chroma and good hiding power which are in addition electrically conductive can be obtained therewith. It is therefore possible to find potential uses of conductive pigments that were not available with the prior-art pigments available to date, for example coloured paint and printed layers having resistances in the antistatic to electrically dissipative range, i.e. in the range from $10^9$ ohm to $10^6$ ohm, measured as specific surface resistance of the corresponding coating or printed layer.

The pigments according to the invention are also highly suitable in security applications, in particular in security printing. They can be employed there for the production of hidden security features which are invisible to the naked eye, but can be read out using corresponding detectors. Thus, with the aid of the pigments according to the invention, it is possible to produce printing inks which give rise to print images having bright interference colours and good electrical conductivity. The electrical conductivity alone can serve as invisible security feature here. However, the pigments according to the invention are particularly suitable for the production of print images which can be printed partly with the pigments according to the invention, partly with electrically non-conductive pigments or pigment mixtures having the same colour. Such print images give rise to a uniform colour impression, but are electrically conductive in some areas and electrically non-conductive in other areas, which can be utilised as hidden security feature which can be read out via the electrical properties or via thermal images.

Security products are, for example, bank notes, cheques, credit cards, shares, passports, identity documents, driving licences, entry tickets, revenue stamps, tax stamps, etc., to mention but a few. These may be provided, for example, with bar codes, 2D data matrix codes, alphanumeric symbols or logos which contain the electrically conductive, coloured interference pigments in accordance with the present invention.

On use of the pigments in paints and coatings, all areas of application known to the person skilled in the art are possible, such as, for example, powder coatings, automobile paints, printing inks for gravure, offset, screen, or flexographic printing and paints in outdoor applications. For the preparation of printing inks, a multiplicity of binders, in particular water-soluble, but also solvent-containing types, for example based on acrylates, methacrylates, polyesters, polyurethanes, nitrocellulose, ethylcellulose, polyamide, polyvinyl butyrate, phenolic resins, melamine resins, maleic resins, starch or polyvinyl alcohol, is suitable. The paints can be water- or solvent-based paints, where the choice of the paint constituents is subject to the general knowledge of the person skilled in the art.

The pigments according to the invention can likewise advantageously be employed for the production of electrically conductive plastics and films, more precisely for all applications known to the person skilled in the art which require electrical conductivity. Suitable plastics here are all standard plastics, for example thermosets and thermoplastics. The pigments according to the invention are subject to the same conditions here as conventional pearlescent or interference pigments. Special features of the introduction into plastics are therefore described, for example, in R. Glausch, M. Kieser, R. Maisch, G. Pfaff, J. Weitzel, Pearlescent pigments, Curt Vincentz Verlag, 1996, 83 ff.

The pigments according to the invention are also suitable for the preparation of flowable pigment preparations and dry preparations which comprise one or more pigments according to the invention, optionally further pigments or colorants, binders and optionally one or more additives. Dry preparations are also taken to mean preparations which comprise 0 to 8% by weight, preferably 2 to 8% by weight, in particular 3 to 6% by weight, of water and/or of a solvent or solvent mixture. The dry preparations are preferably in the form of pearlets, pellets, granules, chips, sausages or briquettes and have particle sizes of about 0.2 to 80 mm.

Due to their electrically conductive and colour properties, the interference pigments according to the invention can particularly advantageously be employed, for example, in decorative surfaces with an antistatic finish. Besides the electrical properties, which can be controlled well by the preparation process, the interference pigments according to the invention have a good hiding power, high interference tinting strength and optionally exhibit an optically variable behaviour, so that they are ideal for use for the colouring of otherwise transparent, dielectric layers in the areas of application described above and do not have to be mixed with absorbent colorants or other effect pigments in order also to provide the application medium with an attractive colour, besides the conductive properties.

The interference pigments according to the invention are also particularly suitable for laser marking. When they are added to surface coatings, prints or plastic articles, the outermost, crystalline carbon-containing layer on the pigments can be fully or partly removed or converted into $CO_2$ by laser bombardment, giving coloured, attractive laser markings in the application medium.

The concentration of the interference pigments according to the invention in the respective application medium is dependent on the properties with respect to colouring and electrical conductivity desired therein and can in each case be selected by the person skilled in the art on the basis of conventional recipes.

Although the interference pigments according to the invention have attractive optical and electrically conductive properties and can thus be employed as the sole effect pigments in a very wide variety of applications, it is of course possible and also advantageous, depending on the application, to mix them if necessary with organic and/or inorganic colorants (in particular with white or coloured pigments) and/or other, electrically conductive materials and/or other, electrically non-conductive effect pigments or to employ them together therewith in an application, for example a coating.

In addition, they can also be mixed with one another in various colours or with differently set electrical conductivity if advantages for the application arise therefrom.

The mixing ratios in the case of all mixtures described above are unlimited so long as the advantageous properties of the pigments according to the invention are not adversely affected by the admixed foreign pigments. The pigments according to the invention can be mixed in any ratio with additives, fillers and/or binder systems which are usual for the application.

The pigments according to the invention have attractive bright interference colours of high intensity, if desired an optically variable behaviour and high hiding power at the same time as semitransparency and have good electrically conductive properties. Besides conventional applications of conductive pigments, they are therefore particularly suitable for the production of security features in security applications and for laser marking.

The present invention is intended to be explained below with reference to examples, but not restricted thereto.

EXAMPLES

Example 1

In all inventive examples, a fluidised-bed apparatus which comprises a vertical, cylindrical reaction space which is fitted with a distributor plate at the lower end and with a filter system for retaining the pigments at the upper end, is used as reactor. The fluidised-bed apparatus can be heated and is provided with a vibration device. The pigments are fluidised by the flow of a carrier gas against the pigment bed and, if necessary, additionally by the use of the vibration device. The reaction temperature is in each case in the range from 500° C. to 700° C. The volatile carbon-containing compound (carbon precursor) is fed to the reactor in a mixture with the carrier gas. The reaction time is between 30 and 120 minutes.

500 g of an interference pigment having a red interference colour (Iriodin® 7215 Ultra Red, particle size 10-60 µm, $d_{50}$ about 25 µm, volume weighted, $TiO_2$ on mica, Merck KGaA, Germany) are initially introduced in the fluidised-bed apparatus. The carrier gas nitrogen is passed through a gas wash bottle containing acetone and thus saturated with acetone. The gaseous nitrogen/acetone mixture is passed into the fluidised-bed apparatus, and the pigments are fluidised by the stream of carrier gas and, if necessary, by switching on the vibration device. When the reaction temperature in the range from 500° C. to 700° C. has been reached, the pigments obtained are removed in several batches after reaction times of 30, 60, 90 and 120 minutes and investigated for their carbon content, the specific powder resistance and the $\Delta L$ value. The result is shown in Table 1:

TABLE 1

| T (reaction time) [min] | spec. powder resistance [ohm * cm] | C content by weight [%] | ΔL value |
|---|---|---|---|
| 0 | >10$^9$ | 0.0 | 50.9 |
| 30 | 1132.5 | 0.6 | 23.4 |
| 60 | 815.7 | 0.8 | 22.8 |
| 90 | 185.8 | 1.0 | 19.0 |
| 120 | 54.5 | 1.3 | 14.7 |

All samples of pigments in accordance with Example 1 (reaction time of 30, 60, 90 and 120 min.) investigated by means of Raman spectroscopy confirm the presence of nanocrystalline carbon in the outermost layer. The pigments obtained exhibit a red interference colour, high lustre and an increasing hiding power with increasing carbon content.

Example 2

500 g of an interference pigment having a blue interference colour (Iriodin® 7225 Ultra Blue, particle size 10-60 μm, TiO$_2$ on mica, Merck KGaA, Germany) are initially introduced in the fluidised-bed apparatus. The carrier gas nitrogen is passed through a gas wash bottle containing 2-methyl-3-butyn-2-ol which is heated to a temperature in the range from 30 to 90° C. and thus enriched with the latter. The gaseous nitrogen/2-methyl-3-butyn-2-ol mixture is passed into the fluidised-bed apparatus, and the pigments are fluidised by the stream of carrier gas and, if necessary, by switching on the vibration device. The reaction temperature is set to 500° C. to 700° C. Pigment samples are taken before commencement of the reaction and after 120 minutes and investigated for their carbon content, the specific powder resistance and the ΔL value. The result is shown in Table 2.

TABLE 2

| T (reaction time) [min] | spec. powder resistance [ohm * cm] | C content by weight [%] | ΔL value |
|---|---|---|---|
| 0 | >10$^9$ | 0.0 | 61.3 |
| 120 | 62.4 | 2.9 | 14.7 |

The samples of pigments in accordance with Example 2 investigated by means of Raman spectroscopy (reaction time 120 min.) confirm the presence of nanocrystalline carbon in the outermost layer.

The pigments obtained exhibit a blue interference colour, high lustre and a comparatively high hiding power with semitransparency present.

Example 3

In each case 1 kg of the red interference pigment in accordance with Example 1 are coated at various reaction times with a crystalline carbon-containing layer by the process described in Example 1. Pigments having a carbon content between 0.5 and 2.3% by weight, based on the weight of the interference pigment employed (without carbon layer), are obtained.

Figure 2:
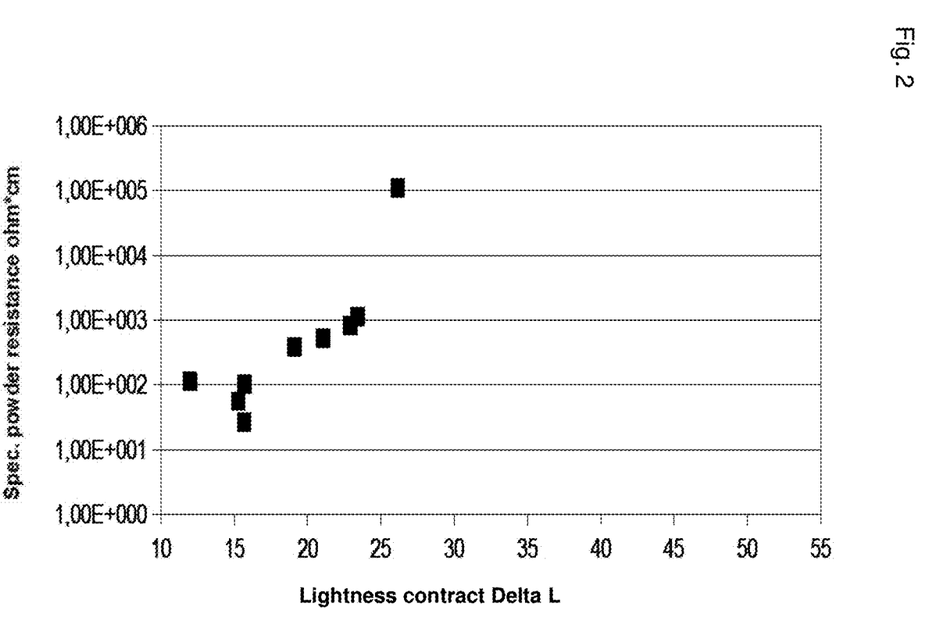
FIG. 2: shows a diagram for illustrating the relationship of specific powder resistance and $\Delta L$ for a pigment in accordance with Example 1

The carbon layers are characterised by SEM photographs, elemental analysis, thermal differential analysis and Raman spectroscopy. In the SEM photographs, continuous carbon layers having a thickness of 1-3 nm, which corresponds to about 3-9 layers of graphite, are evident on the surface of the pigments. The Raman spectra show the presence of essentially graphitic carbon. In addition, the specific powder resistances of the pigments and the colouristic values are determined from black/white coating test charts. The dependence of the specific powder resistance on the lightness contrast ΔL of the pigments is shown in FIG. 2. The figure shows the presence of a specific powder resistance in the range <1×10$^6$ ohm*cm, preferably <1×10$^4$ ohm*cm, at ΔL values of the pigments in the range from 10 to 30.

Example 4

Use Example:

The pigments in accordance with Example 3 are dispersed in NC lacquer (12% of collodium/butyl acrylate in a solvent mixture). PET films are coated with the respective coating preparation. The pigment weight concentration (PWC) of the pigments in the dry coating layer is 42%, the layer thickness of the coating layer is 40 μm. After drying of the coating layers, the respective surface resistance of the coating layer is measured at a field strength of 100 V/cm with the aid of a spring-tongue electrode (1 cm electrode separation, length 10 cm).

Figure 3:
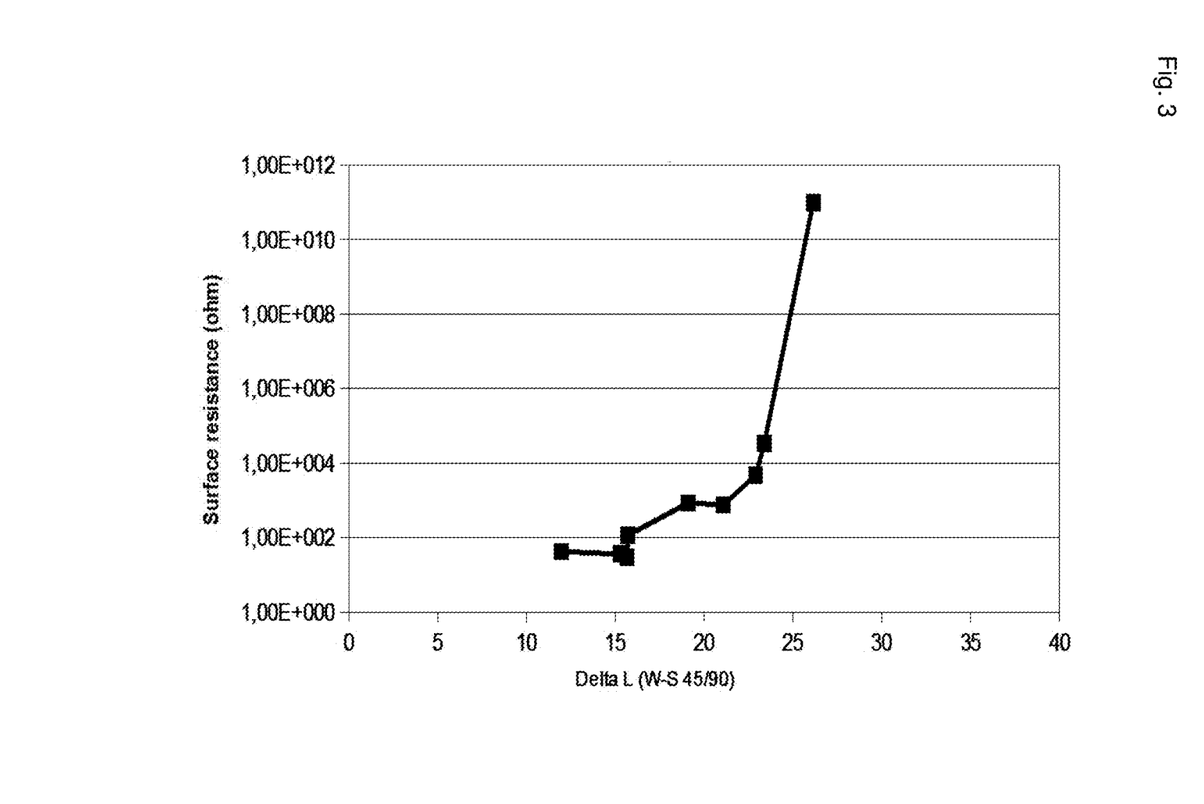
FIG. 3: shows a diagram for illustrating the relationship of specific surface resistance of a coating layer and $\Delta L$ for a pigment in accordance with Example 3

The results are shown in FIG. 3. The results show that both optically attractive and also electrically conductive coatings are obtained with the pigments according to the invention. By increasing the pigment weight concentration, an electrical conductivity in the antistatic range (<10$^9$ ohm) can also be achieved, even with the least conductive pigment, while the PWC of the very highly conductive pigments can also be reduced further for this aim.

Coating layers of the same colour which can be obtained by blending Iriodin® 7215 Ultra Red with carbon black would, by contrast, have no electrical conductivity at all.

Comparative Example 1

Mixtures of the red interference pigment from Example 1 (Iriodin® 7215 Ultra Red) with carbon black (Printex L from Orion Engineered Carbons, Inc.) are prepared in such a way that the mixture in each case has the carbon content shown in Table 3. In each case, the specific powder resistance of the mixtures obtained is measured. In addition, black/white coating test charts are provided with a coating which, apart from binder and solvent, only comprises the corresponding pigment mixture. The ΔL values of the dried coatings are determined as described above.

TABLE 3

| spec. powder resistance [ohm * cm] | Carbon black content by weight [%] | ΔL value |
|---|---|---|
| >10$^9$ | 0.0 | 50.9 |
| >10$^9$ | 0.5 | 12.5 |
| >10$^9$ | 1.0 | 9.8 |
| >10$^9$ | 1.5 | 6.3 |
| >10$^9$ | 2.0 | 5.0 |
| >10$^9$ | 2.5 | 4.3 |

The desired specific powder resistance of less than 1×10$^6$ ohm*cm cannot be achieved with the carbon black/interference pigment mixtures. In addition, the blends exhibit a ΔL value in the coating application which is very greatly reduced even with the smallest added amount of carbon black and which cannot be established specifically via the added amount of carbon black.

Comparative Example 2

Carbon-containing coatings on effect pigments, inter alia on interference pigments, which are obtained by decomposition of polymeric coatings on the surface of interference pigments are known from the prior art. As comparison, therefore, 50 g of Iriodin® 7215 Ultra Red (see Example 1) are mixed intimately with 10 g of furfuryl alcohol. The polymerisation of furfuryl alcohol is subsequently initiated by addition of hydrochloric acid. An interference pigment having an outermost layer of polyfurfuryl alcohol is obtained. The pigment powder is subsequently pyrolysed under inert gas at a temperature in the range from 500° C. to 800° C. The dark pigment obtained has a proportion by weight of carbon of 5.8% and a specific powder resistance of $6.3 \times 10^6$ ohm*cm. The ΔL value determined from the coatings of black/white coating test charts is 5.3.

The invention claimed is:

1. Electrically conductive, coloured interference pigments comprising a flake-form support and a plurality of layers on said support,
    wherein said support is natural or synthetic mica flakes or $SiO_2$ flakes,
        wherein the support has a coating comprising one or more layers and
        wherein the outermost layer on the support consists of at least 95% by weight, based on the weight of this layer, of carbon and comprises crystalline carbon in the form of graphite and/or graphene,
            wherein said outermost layer surrounds the layer(s) located beneath this outermost layer on the support flake and has a geometrical thickness in the range of 1-5 nm, wherein the interference pigments comprise between the substrate flake and said outermost layer, a layer of titanium dioxide and/or titanium dioxide hydrate or at least a three-layer system of $TiO_2$-layer/$SiO_2$-layer/$TiO_2$-layer,
        wherein the geometrical thickness of at least one $TiO_2$-layer is greater than 70 nm, and wherein the electrically conductive interference pigments have a specific powder resistance of less than $1 \times 10^6$ ohm*cm.

2. Interference pigments of claim 1, wherein the outermost, crystalline carbon-containing layer consists of at least 98% by weight of carbon.

3. Interference pigments of claim 1, wherein the proportion of the outermost, crystalline carbon-containing layer, based on the weight of the pigment, is 0.5 to 5% by weight.

4. Interference pigments of claim 1, wherein the interference pigments have a particle size in the range from 1 to 250 μm, and wherein interference pigments having a particle size of less than 10 μm are present with a percentage proportion by volume of at most 30% in a pigment powder consisting of the interference pigments.

5. Interference pigments of claim 1, wherein the specific powder resistance is less than $1 \times 10^4$ ohm*cm.

6. A process for the preparation of electrically conductive, coloured interference pigments of claim 1, comprising
    coating flake-form support particles comprising natural or synthetic mica or of $SiO_2$-flakes, which are optionally coated with one or more layers, said one or more layers comprising a layer of titanium dioxide and/or titanium dioxide hydrate, or an at least three-layer-system of $TiO_2$-layer/$SiO_2$-layer/$TiO_2$-layer,
        with an outermost layer which consists of at least 95% by weight, based on the weight of this layer, of carbon and comprises crystalline carbon in the form of graphite and/or graphene, said outermost layer having a geometrical thickness in the range from 1 to 5 nm,
        in a reactor in a stream of carrier gas with feed of a gaseous, carbon-containing compound by pyrolytic decomposition of the carbon-containing compound at a temperature in the range of from 500° C. to 700° C., wherein the carbon-containing compound employed is acetone or 2-methyl-3-butyn-2-ol and
    wherein the electrically conductive interference pigments have a specific powder resistance of less than $1 \times 10^6$ ohm·cm.

7. The process of claim 6, wherein the flake-form support particles are kept in motion in the reactor.

8. Paints, coatings, printing inks, coating compositions, security applications, plastics, ceramic materials, glasses, paper, films, in heat protection, in floorcoverings, for laser marking, in dry preparations or pigment preparations containing an electrically conductive, coloured interference pigment of claim 1.

* * * * *